(No Model.)
N. FORESHAW.
SAD IRON HEATER.
No. 381,468. Patented Apr. 17, 1888.
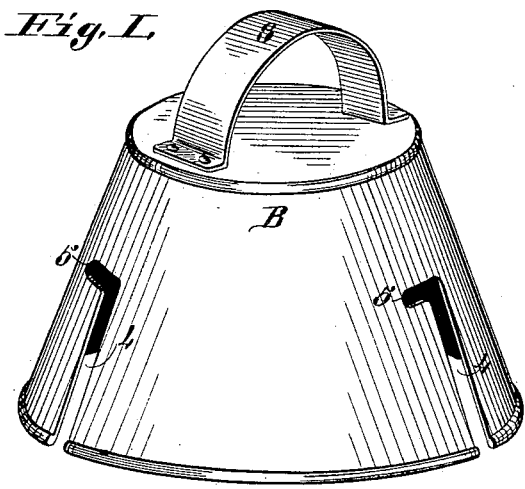
Fig. I.
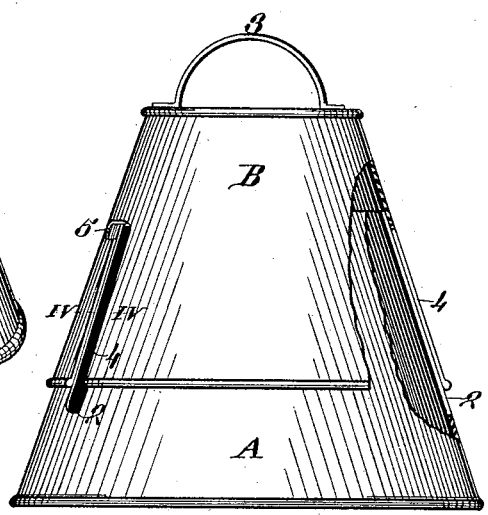
Fig. II.
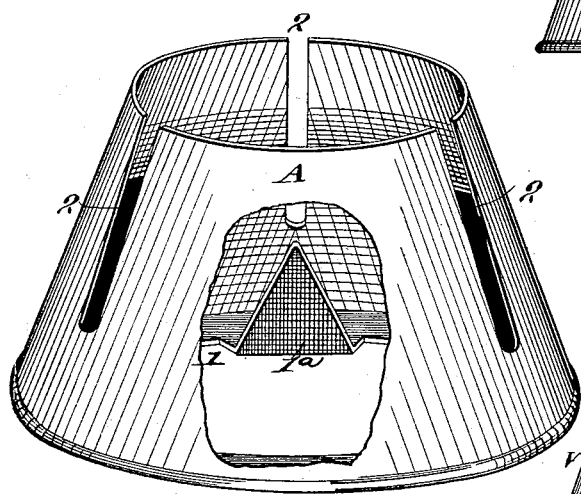
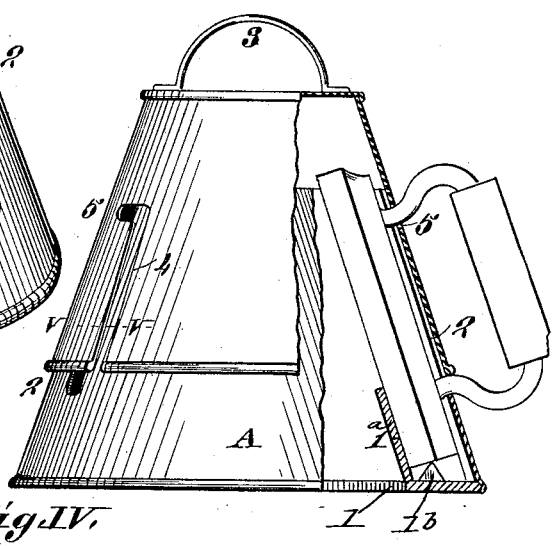
Fig. III.
Fig. IV.
Fig. V.
Attest:
Judy Klein
John H. Fisse
Inventor:
Nathan Foreshaw
By Wm. E. Fisse
Attorney

UNITED STATES PATENT OFFICE.

NATHAN FORESHAW, OF ST. LOUIS, MISSOURI.

SAD-IRON HEATER.

SPECIFICATION forming part of Letters Patent No. 381,468, dated April 17, 1888.

Application filed October 11, 1887. Serial No. 251,993. (No model.)

*To all whom it may concern:*

Be it known that I, NATHAN FORESHAW, of the city of St. Louis, in the State of Missouri, have invented a new and useful Improvement in Sad-Iron Heaters; and I do hereby declare that the following is a full, clear, and accurate description thereof, reference being had to the accompanying drawings, forming a part of this specification, in which—

Figure I represents a perspective view of the heater with cover removed and receptacle or holder partly broken away to show the rest or support for the sad-iron. Fig. II is a side elevation of the heater with cover in place, a part of both cover and receptacle or holder being broken away, the cover being in position to lock with the handle of the sad-iron. Fig. III is a side elevation of the heater with cover in place, portions of the cover and receptacle or holder being broken away, as in the preceding figure, and showing position of the sad-iron, the latter being locked in place. Fig. IV is a detail horizontal section on the line IV IV in Fig. II. Fig. V is a horizontal section on the line V V in Fig. III.

My invention relates to sad-iron heaters intended to be used upon gasoline, oil, or gas stoves and designed to heat the irons by the ordinary flame proceeding from the burner of such stove.

The heater is composed of two parts: first, a receptacle or holder for the irons, (shown in the drawing A of Fig. I,) and, second, a removable cover or hood for the same. (Shown in drawing B of the same figure.) The irons are placed within the heater in an upright position, resting on a proper support in the base thereof. The cover fits over the holder and envelops the major part of the same. The handles of the irons project through the slots, hereinafter mentioned, in the holder and cover, by means of some of which slots the irons are also locked in place, as hereinafter described. The heater may be manufactured of any suitable material.

The receptacle A, which may be made in any desired shape according to the character and number of the irons to be placed therein, (although I prefer the conical form shown in the drawings, which I find to be the most convenient shape for ordinary purposes,) is provided with a suitable support (shown at 1 in Figs. I and III of the drawings) situated within the holder and at the bottom, upon which the irons are placed. This support may be made in various ways; but I find it most convenient for practical purposes to make it in the form of a flat ring to be secured to the base of the holder by any suitable means, this ring being widened at the points opposite the slots 2, and having rising upwardly at this point and inclined at a slight angle to the ring a triangular rest, (marked 1$^a$,) against which the bottom of the iron is placed. In front of these triangular supports, and at each side thereof, are small conical lugs, (marked 1$^b$ in the drawings, and best shown in Fig. III,) which slope toward the rest 1$^a$, which lugs furnish support for the straight or rear end of the iron. The receptacle or holder is open both at the top and bottom and is hollow throughout its entire length. In its sides, and in number and position conforming to the rests 1, against or upon which the irons are placed, there are cut vertical slots, (marked 2 in the drawings and most clearly shown in the drawing A of Fig. I.) These slots extend from the upper edge of the receptacle, where they are open a sufficient length downwardly to allow the handle of the irons resting on the supports within the heater to pass through.

The cover or hood B in its shape conforms to the shape of the receptacle or holder, and fits over the same. Its lower edge rests on the inner surface of the lower portion of the handle of the irons in the heater when in locked position, so that the hood incloses entirely all that portion of the holder which is above this point of contact with the handles of the irons. The cover is removable, is hollow, is open at the bottom, but closed on top, and is provided with a suitable bail, (marked 3 in the drawings,) whereby it may be lifted. In this cover are also vertical slots, (marked 4 in the drawings,) through which the handles of the irons are passed when the same are placed over the holder. In number and position these slots 4 conform to the slots 2 in the receptacle or holder, and they are of a length sufficient to accommodate the handles of the irons. They terminate at the lower edge of the cover, where they are open. At the upper end of each one of these slots 4, and at one side thereof and connecting with the same, so as to form only one opening, are short horizontal slots, (marked 5 in the drawings.)

After the irons have been placed in position within the holder the cover is put over the same, the slots 4 being over slots 2, so as to have an opening for the handles of the irons. The cover is then turned until the slots 5 engage and lock with the upper portion of the handles of the irons in the heater, that portion of slots 2 between the ends of the handles being closed by the sides of the cover, and the lower part of the handles of the irons being locked in the lower end of the slot 2 by the cover, which rests upon the same. By this means the irons are securely held in place, while at the same time the flame is confined entirely within the body of the heater, the metal in the sides of the cover operating also to shield the handle of the iron from the direct action of the heating-flame of the stove. The position of the slots in the holder and cover when the iron is locked in place is shown in Fig. III, and also in the detail horizontal sections IV and V.

The merit of this invention consists in inclosing the body of the sad-iron entirely within the heater, which also entirely envelops the heating-flame. The entire quantity of heat generated by the burner is thus most efficiently used to heat the irons, while the latter are at the same time protected from the cooling influence of the surrounding atmosphere, and the handles are also shielded from the direct action of the flame.

What I claim as my invention, and desire to secure by Letters Patent, is—

1. The sad-iron heater above described, consisting of a hollow receptacle or holder for the irons, open at the top and bottom, and a removable hood or cover for the same, also open at the bottom, but closed on top, and having a suitable bail or handle, the holder being provided with suitable rests or supports for the irons within and at its base, the said holder and hood having in their sides slots through which the handles of the irons may project, substantially as shown and described above.

2. A sad-iron heater consisting of a hollow receptacle or holder for the irons, open at the top and bottom, and having within and at its base suitable rests or supports for the irons, and having in its sides vertical slots through which the handles of the irons may project, such slots conforming in number and position to the rests or supports for the irons within the holder, and a removable hood or cover to be placed over the holder, also hollow, open at the bottom, but closed on top, and provided with a suitable bail or handle having in its sides vertical slots in number and position conforming to the vertical slots in the holder, and having also at the upper end of these vertical slots, and at one side thereof, horizontal slots connecting with the same, so as to form one opening, whereby the handles of the irons projecting through the vertical slots in the holder and cover may be locked with the cover and secured in place, and the slots in the holder may be closed so as to prevent the heat from escaping.

NATHAN FORESHAW.

Witnesses:
FRANK HICKS,
MARCUS H. TAFT.